(12) United States Patent
Zhao et al.

(10) Patent No.: US 11,630,929 B2
(45) Date of Patent: Apr. 18, 2023

(54) LINEARIZATION IDENTIFICATION METHOD FOR HYSTERESIS MODEL OF PIEZOCERAMICS BASED ON KOOPMAN OPERATORS

(71) Applicant: HARBIN INSTITUTE OF TECHNOLOGY, Harbin (CN)

(72) Inventors: Bo Zhao, Harbin (CN); Xue Qi, Harbin (CN); Weijia Shi, Harbin (CN); Jiubin Tan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 336 days.

(21) Appl. No.: 17/079,428

(22) Filed: Oct. 24, 2020

(65) Prior Publication Data
US 2021/0042454 A1    Feb. 11, 2021

(30) Foreign Application Priority Data

Apr. 24, 2020    (CN) .......................... 202010329026.6

(51) Int. Cl.
*G06F 30/20*    (2020.01)
*G06N 3/08*    (2023.01)
*G06F 111/10*    (2020.01)

(52) U.S. Cl.
CPC .............. *G06F 30/20* (2020.01); *G06N 3/08* (2013.01); *G06F 2111/10* (2020.01)

(58) Field of Classification Search
CPC ........ G06F 30/20; G06F 2111/10; G06N 3/08

USPC ............................................................ 703/6
See application file for complete search history.

(56) References Cited

PUBLICATIONS

Mrad et al. (Dynamic Modeling of Hysteresis in Piezoceramics, 6 pages). (Year: 2001).*
Yeung et al. (Learning Deep Neural Network Representations for Koopman Operators of Nonlinear Dynamical Systems, (8 pages). (Year: 2019).*
Chwastek et al. (Identification of a hysteresis model parameters with genetic algorithms, (6 pages). (Year: 2006).*

* cited by examiner

*Primary Examiner* — Andre Pierre Louis
(74) *Attorney, Agent, or Firm* — IPro, PLLC; Na Xu

(57) ABSTRACT

The disclosure provides a linearization identification method for a hysteresis model of piezoceramics based on Koopman operators, and belongs to the field of precision positioning. In order to solve the problem of hysteresis of a piezoelectric actuator in practical application, the disclosure further provides the linearization identification method for the hysteresis model of the piezoceramics based on Koopman operators. The method of the disclosure includes: Step I, building a structure of the hysteresis model of the piezoceramics; Step II, determining parameters of the hysteresis model of the piezoceramics; Step III, obtaining a great amount of simulation data by using simulation software; Step IV, performing deep learning training based on Koopman operators; and Step V, determining a linearization model for the hysteresis model of the piezoceramics based on Koopman operators. The disclosure is applicable to piezoelectric actuator control and precision positioning.

1 Claim, 3 Drawing Sheets

Result of hysteresis model simulation

Result reconstructed by deep learning network

Comparison of displacement of hysteresis model simulation and reconstructed displacement Corresponding error

LINEARIZATION IDENTIFICATION METHOD FOR HYSTERESIS MODEL OF PIEZOCERAMICS BASED ON KOOPMAN OPERATORS

TECHNICAL FIELD

The disclosure relates to a linearization identification method for a hysteresis model of piezoceramics based on Koopman operators, and more particularly to the field of piezoelectric precision positioning.

BACKGROUND

The precision positioning technology in a micro-displacement system can achieve sub-micron or even nano-level positioning precision, and relates to the fields of precision instruments, processing industry, precision detection, automatic control, etc. Therefore, the technology is widely applied to the fields of microelectronics, robots, aerospace, bioengineering, etc.

The realization of precision positioning depends on the technical support of precision actuator positioning, precision displacement measurement, precision control, precision equipment processing, etc. Driving methods are mainly divided into mechanical driving and electromechanical driving. The electromechanical driving includes electrothermal driving, electromagnetic driving and piezoelectric driving. As a traditional actuator, a mechanical actuator has the problems of complex mechanical structure, mechanical friction and the like, which influence the positioning precision and sensitivity. Although an electrothermal actuator is simple in structure and convenient to operate, the mechanism thermal deformation caused by temperature control also influences the positioning precision. An electromagnetic actuator always requires the application of electric current in a work process, so that the thermal deformation may influence its precision. Unlike the other methods, an electromagnetic actuator method may cause magnetic field leakage.

As a novel micro-displacement device, based on the inverse piezoelectric effect, a piezoelectric actuator converts electric energy into elastic potential energy, and then converts the elastic potential energy into required mechanical energy. Compared with a traditional actuator, the piezoelectric actuator has advantages in various aspects: a structure is simple and compact; no noise and no thermal deformation are generated; a theoretical positioning resolution is high, and a nano-level resolution can be realized to a highest degree; the frequency response is fast, and the piezoelectric actuator can be applied to a high-response fast positioning system; and the energy density is high. Therefore, the piezoelectric actuator is widely used in precision positioning, such as fast tool servo machinery, scanning probe microscopes, optical fiber communication, precision guidance for spacecrafts, and molecular or atomic level scanning microscopes. However, in practical application, the piezoelectric actuator also has problems of hysteresis, creepage, static nonlinearity, etc., so that the repeatability of the positioning precision is inevitably reduced, and even the instability of a closed-loop system is caused. Among these factors, hysteresis nonlinearity is a key factor influencing the performance improvement of the micro-displacement system.

In order to effectively reduce the influence of the hysteresis nonlinearity on the positioning precision, hysteresis modeling and control is performed on piezoceramics, and there are three mature hysteresis models at present, including a mathematical model, such as a Preisach model, a Krasnoselskii-Pokrovskii (KP) model, and a Prandtl Ishlinskii (PI) model; a physical model, such as a JilesAtherton model, a Voigt model and an energy model; and a model based on intelligent computing, such as an artificial neural network (NN) model and a support vector machine model. Compensation control based on an inverse model is the most widely used control method at present, which uses an inverse hysteresis model to compensate the hysteresis of a piezoelectric actuator itself, so that the input and output of the system have a linear relationship, and the purpose of eliminating the influence of the hysteresis nonlinearity of the system is achieved. The premise of the application of the inverse model compensation control is to establish an accurate hysteresis model, and the main problems are as follows: (1) a solution of an inverse model is difficult to solve, and calculation is complicated; (2) the sensitivity to changes of input signals, loads or working conditions is high, and the adaptability and robustness are lacked; and (3) the real-time performance of inverse model engineering under high dynamic conditions is a difficult problem for inverse compensation.

Solving nonlinear dynamics in a linear framework is more and more widely used, so the identification of a nonlinear hysteresis model in the linear framework is considered to be of great advantages in aspects of analysis and control. Linearization methods at present include a differential geometry method, a state observer method, a piecewise linearization method, a spline function method and a local ARMAX model linearization method. Unfortunately, a great amount of simplification is applied to these methods, and it will also influence the positioning precision. In recent years, neural networks have made a revolutionary progress in identification and global linearization of the piezoelectric actuator, making it possible to identify the hysteresis model of the piezoelectric actuator by using deep learning in the linear framework.

SUMMARY

The disclosure performs studies by aiming at the problem that hysteresis nonlinearity of a piezoelectric actuator influences positioning precision during the precision positioning, and has a purpose of improving the precision of the precision positioning of the piezoelectric actuator in a micro-displacement system. In order to achieve the purpose, the disclosure performs hysteresis nonlinearity analysis of piezoceramics according to a classical hysteresis model. A linearization identification method for a hysteresis model of piezoceramics based on Koopman operators includes the following steps:

Step I: building a structure of the hysteresis model of the piezoceramics;

Step II: determining parameters of the hysteresis model of the piezoceramics;

Step III: obtaining a great amount of simulation data by using simulation software;

Step IV: performing deep learning training based on Koopman operators; and

Step V: determining a linearization model for the hysteresis model of the piezoceramics based on Koopman operators.

The disclosure has the following beneficial effects:

1. The method of the disclosure realizes the identification of the hysteresis nonlinear model of the piezoelectric actuator in a linear framework, so that linear control is capable of being performed, and complicated derivation and approximation of inverse model solution are avoided.

2. The method of the disclosure performs deep learning training on the hysteresis model based on Koopman operators. Based on a great amount of test, training and verification data, errors caused by a great amount of approximation in a traditional linearization method are avoided, and the higher positioning precision can be ensured.

DETAILED DESCRIPTION

Specific implementation I: A linearization identification method for a hysteresis model of piezoceramics based on Koopman operators according to this implementation is realized according to the following steps:

Step I: a structure of the hysteresis model of the piezoceramics is built.

Step II: parameters of the hysteresis model of the piezoceramics are determined.

Step III: a great amount of simulation data is obtained by using simulation software.

Step IV: deep learning training based on Koopman operators is performed.

Step V: a linearization model for the hysteresis model of the piezoceramics based on Koopman operators is determined.

Specific implementation II: The differences of this implementation from Specific implementation I are that the Step I of building a structure of the hysteresis model of the piezoceramics is realized according to the following steps:

A group of hysteresis operators with given weight functions is superposed, so that global hysteresis is capable of being represented since a classical Preisach model hysteresis curve is capable of being divided into two parts: local hysteresis and global hysteresis, and a Preisach hysteresis model is constructed by superposing a plurality of simple hysteresis operators, and the hysteresis model is capable of being expressed as superposition of a series of hysteresis operators $\hat{\gamma}_{\sigma\varepsilon}$ with weights:

$$x(t) = \int\int_{\sigma \geq \varepsilon} \mu(\sigma, \varepsilon)\hat{\gamma}_{\sigma\varepsilon}[v(t)]d\sigma d\varepsilon, \quad (1)$$

x(t) represents a model output at a time t. v(t) represents a model input at the time t. $\hat{\gamma}_{\sigma\varepsilon}$ and μ(σ,ε) respectively represent a basic hysteresis operator and a weight function thereof, and are generally called as a Preisach function.

Figure 1:
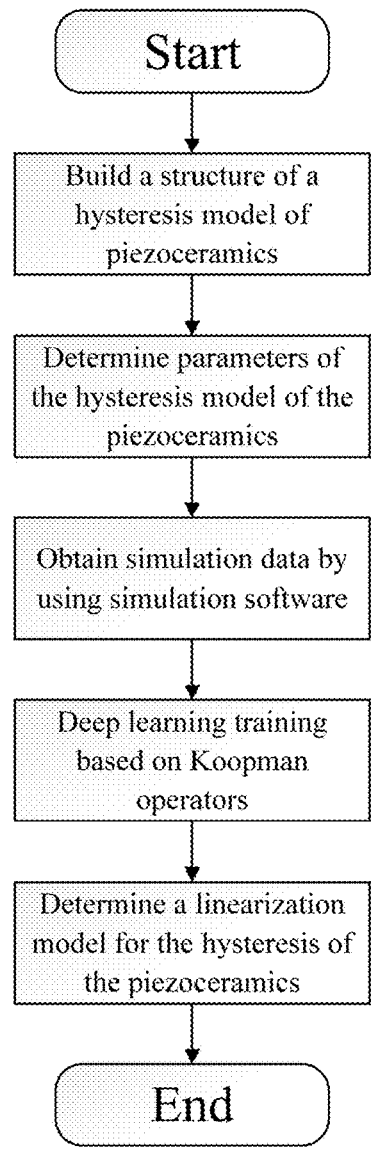
FIG. 1 is a schematic block diagram of a flow process of a linearization identification method for a hysteresis model of piezoceramics based on Koopman operators.
Figure 2:
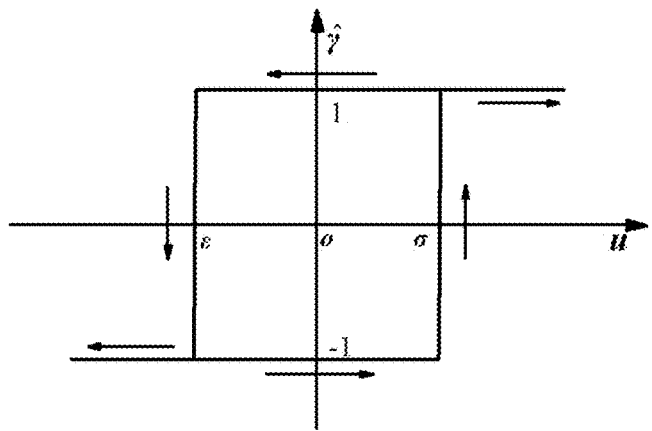
FIG. 2 is a basic hysteresis operator $\hat{\gamma}_{\sigma\varepsilon}$ of the piezoceramics.
Figure 3:
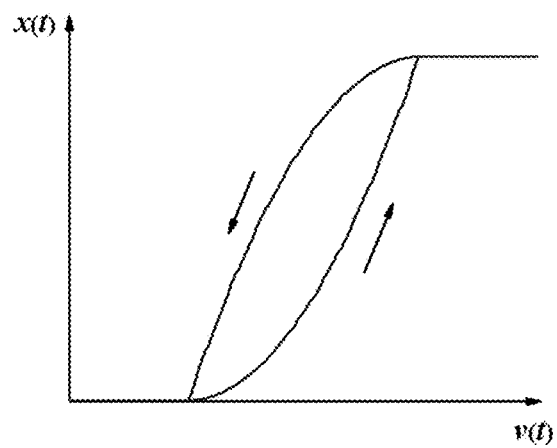
FIG. 3 is a hysteresis nonlinearity characteristic curve of the piezoceramics.

The basic hysteresis operator is related to a pair of switching values (σ,ε). σ and ε are respectively an increasing threshold and a decreasing threshold. The basic hysteresis operator is shown in FIG. 2.

Specific implementation III: The differences of this implementation from Specific implementation I or II are that the Step II of determining parameters of the hysteresis model of the piezoceramics is realized according to the following steps:

It is assumed that the number of the hysteresis operators in Formula (1) is limited, so that Formula (1) is capable of being expressed as:

$$x(t) \approx \sum_{i=1}^{M}\sum_{j=1}^{M}\mu(\sigma_i, \varepsilon_j)\hat{\gamma}_{\sigma_i\varepsilon_j}[v(t)], \quad (2)$$

Through derivation of Step I, it is capable of being known that a displacement output of a piezoelectric actuator is capable of being determined as long as a value of the weight function is determined. Firstly, the increasing and decreasing thresholds σ and ε are respectively divided into M equal parts:

$$\sigma_i = \varepsilon_j = (M-i)/(M-1)\sigma_1, \quad (3).$$

$\sigma_1$ and $\varepsilon_1$ respectively represent positive and negative saturated input values of the piezoelectric actuator, and the total number of the hysteresis operators is $M^2$.

Firstly, a function value table built according to an output displacement value corresponding to an equant full range voltage of the piezoelectric actuator is obtained. According to an interpolation method, a voltage is raised from 0 to any one equant point voltage, then, the voltage is reduced, the displacement output value at each equant point voltage is recorded in the voltage reducing process, and this value is a corresponding weight function value. The weight function value corresponding to the voltage not at the equant point voltage is capable of being obtained by a difference value method. For any one control voltage sequence, function fitting is capable of being performed according to data to predict the actuator output displacement corresponding to any voltage. When an equant number is M, M(M+1) displacement outputs (i.e., the values of the weight functions) need to be measured.

When the equant number M is smaller, the voltage is sparsely divided, so that a possible error of the value of the weight function corresponding to the voltage obtained by the interpolation method not on the equant point is greater. In order to reduce the interpolation error to ensure the precision of the model, the equant number needs to be possibly great.

Other steps and parameters are identical to those in one of Specific implementations I to II.

Specific implementation IV: The differences of this implementation from one of Specific implementations I to III are that the Step III of obtaining a great amount of simulation data by using simulation software is realized according to the following steps:

Hysteresis modeling is realized by using simulation software Matlab since the weight function corresponding to the Preisach model is capable of being determined in Step II and based on Formula (2), the hysteresis displacement output of the piezoelectric actuator is capable of being determined, so as to obtain a great amount of hysteresis displacement output, and to create a data set required for neural network training.

A triangular wave signal is selected as a simulation input for a driving voltage of the piezoelectric actuator and corresponding hysteresis displacement is output after simulation, so as to better represent hysteresis characteristics, wherein under different initial conditions, different hysteresis displacement output data is capable of being obtained. These data sets are divided into three parts: a test set, a verification set and a training set, and a neural network training sample is formed. At the same time, two different sampling times are set during simulation. A smaller time interval is adopted near the increasing threshold and the decreasing threshold, i.e., sampling points are more, so that the more accurate model identification at the increasing threshold and the decreasing threshold is ensured.

Other steps and parameters are identical to those in one of Specific implementations I to III.

Specific implementation V: The differences of this implementation from one of Specific implementations I to IV are that the Step IV of performing deep learning training based on Koopman operators is realized according to the following steps:

A discrete nonlinear system is considered since Koopman analysis is substantially similar to coordinate transformation and realizes global linearization of a nonlinear system:

$$x_{k+1}=F(x_k), x \in R^n, \quad (4).$$

$x \in R^n$ is a system state. F represents a function for forwards mapping the system state. Generally, discrete sampling is performed on the time. A continuous time system is described by a dynamic discrete time system, i.e., $x_k=x(k\Delta t)$, and a sampling time $\Delta t$ is realized. It is considered that the Koopman operator K in a Hilbert space is an infinite dimension linear operator, and meets:

$$Kg(x_k)=g(x_{k+1})=g(F(x_k)). \quad (5).$$

The Koopman operator is assumed to have a discrete spectrum, i.e., a corresponding characteristic value and characteristic function exist, and are respectively $\{\lambda_1, \lambda_2, \lambda_3, \ldots\}$ and $\{\phi_1, \phi_2, \phi_3, \ldots\}$, and $K\phi_i=\lambda_i\phi_i$ is met. The characteristic function meets orthogonality conditions. The characteristic function $\{\phi_1, \phi_2, \phi_3, \ldots\}$ is used as a group of new orthogonal basis vectors in a new coordinate system. The spreading of the system in the new coordinate system is linear.

In order to enable a strong nonlinear dynamic system to be approximately linear, the characteristic function of the Koopman operator is capable of being identified through mathematical characteristics. The identification of the nonlinear coordinate is completed by an autoencoder. This is an unsupervised machine learning method, and has the unique advantage of effectively extracting data characteristics. The autoencoder generally consists of two cascade networks: one is an encoder for compressing the input into a potential space to express, and the other one is a decoder for reconstructing the input from the potential space. They are capable of being respectively expressed through an encoding function and a decoding function:

$$y=\psi(x), \quad (6),$$

and $$r=\psi^{-1}(y), \quad (7).$$

Therefore, the whole autoencoder is capable of being described by a function:

$$\psi^{-1}(\psi(x))=r \quad (8).$$

The output r is similar to the original input x.

Constraints are built in a reconstructed task to enable y in the potential space to be meaningful. On the premise that the dimension of y is smaller than the input x, the important mathematical characteristics are capable of being extracted through training. Under ideal conditions, once the number and the width of hidden layers of the encoder and the decoder are accurately determined, any required autoencoder structure is capable of being successfully obtained through training.

Figure 5:
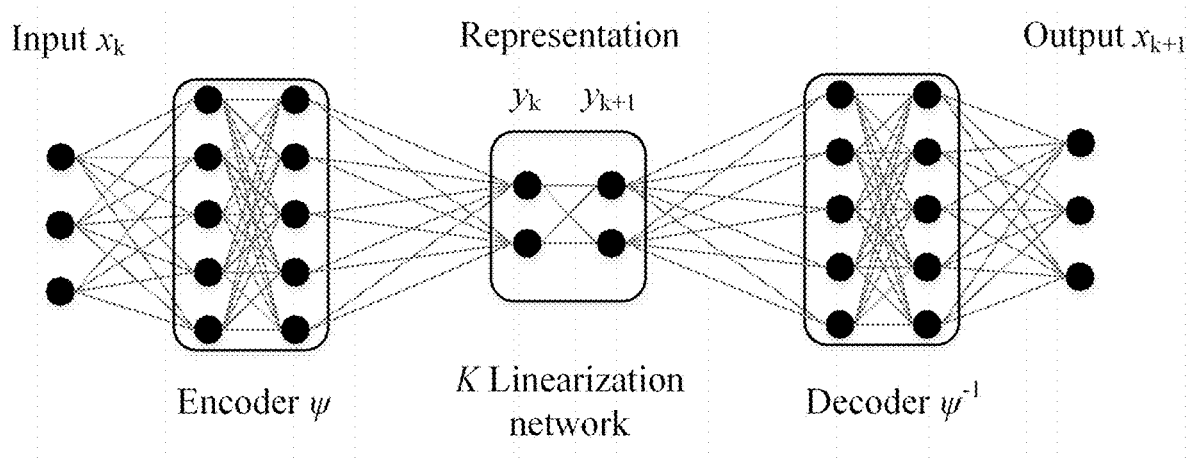
FIG. 5 is an autoencoder framework for identifying a Koopman characteristic function.

The hidden layers have the same form (Wx+b), and are activated by a rectified linear unit (RELU):$f(x)=\max\{0,x\}$. Output layers of the encoder, the decoder and an auxiliary network are all linear (simply expressed as Wx+b). The input of the auxiliary network is y in the potential space. The output is a parameter of the characteristic value of K. A neural network framework is shown in FIG. 5.

Other steps and parameters are identical to those in one of Specific implementations I to IV.

Specific implementation VI: The differences of this implementation from one of Specific implementations I to V are that the Step V of determining a linearization model for the hysteresis model of the piezoceramics based on Koopman operators is realized according to the following steps:

The test set, the verification set and the training set obtained in the Step III are taken as inputs. A proper learning rate of an optimizer is set. The number and the width of hidden layers of the encoder, the decoder and the auxiliary network are set. The optimizer adopted in the training is an Adam optimizer.

Deep learning is performed by using a TensorFlow framework in Python API. An autoencoder model framework determined in the Step IV is trained for a period of time. Whether the training of the autoencoder model framework provided in the Step IV is completed or not is determined by judging the size of a loss function. The loss function has three weighted mean square error components: a reconstructed precision error $L_{re}$, a future state prediction error $L_{pre}$ and a dynamic linearization error $L_{li}$. A data point with the maximum loss is punished by using an $L_\infty$ term. Finally, in order to avoid excessive fitting, $l_2$ regularization is considered on the basis of the weight W:

$$L=\alpha_1(L_{re}+L_{pre})+L_{li}+\alpha_2 L_\infty+\alpha_3\|W\|_2^2 \quad (9),$$

$$L_{re}=\|x-\varphi^{-1}(\varphi(x))\|_{MSE} \quad (10),$$

$$L_{pre}=\varphi(x_{k+1})+K\varphi(x_k) \quad (11),$$

$$L_{li}=x_{k+1}-\varphi^{-1}(K\varphi(x_k)) \quad (12),$$

and $$L_\infty=\|x_1-\varphi^{-1}(\varphi(x_1))\|_\infty+\|x_2-\varphi^{-1}(K\varphi(x_1))\|_\infty \quad (13).$$

MSE represents a mean square error. Weights $\alpha_1$, $\alpha_2$ and $\alpha_3$ are hyper-parameters. After the training is completed, the weight of each network branch is capable of being determined, i.e., the encoder, the decoder and the auxiliary network are determined. The decoder in the autoencoder network obtained through training is capable of reconstructing a reconstructed displacement result of the Preisach hysteresis model, and the auxiliary network is capable of outputting the parameter of the characteristic value of K, so that the linearization model for the hysteresis model of the piezoceramics based on Koopman operators is determined by using Formula (5).

Other steps and parameters are identical to those in one of Specific implementations I to V.

Embodiment

Figure 4:
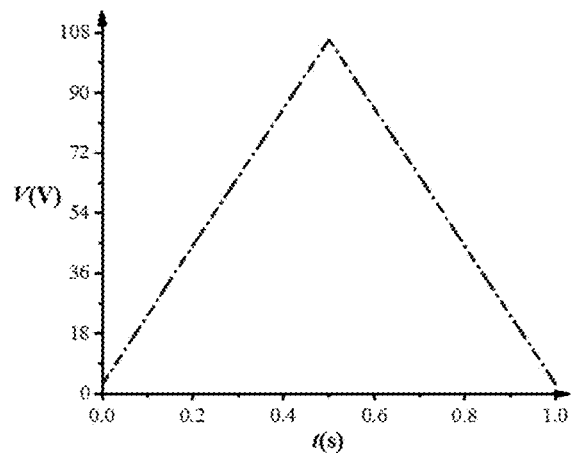
FIG. 4 is a triangular wave driving voltage signal.

The disclosure provides a linearization identification method for a hysteresis model of piezoceramics based on Koopman operators. The simulation parameters are as follows:

A driving voltage of the piezoelectric actuator is set as a triangular wave signal with a frequency of 1 Hz and an amplitude value in a range of 3 to 106 V, as shown in FIG. 4. During simulation, two different sampling times $3\times10^{-4}$ s and $4\times10^{-5}$ s are set. A smaller time interval of $4\times10^{-5}$ s is adopted near the increasing threshold and the decreasing threshold, i.e., the sampling points are more, so that the more accurate model identification at the increasing threshold and the decreasing threshold is ensured. The number and the width of the hidden layers of the encoder, the decoder and the auxiliary network of the autoencoder network are shown in Table 1.

TABLE 1

|  | Number of hidden layers | Width of hidden layers |
|---|---|---|
| Encoder | 2 | 30 |
| Decoder | 2 | 30 |
| Linearization network | 3 | 10 |

Figure 6:
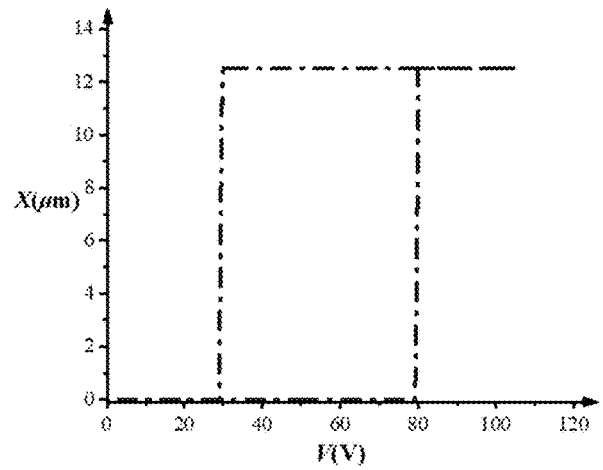
FIG. 6 is the predicated displacement of hysteresis model simulation and a displacement curve reconstructed by a deep learning network.
Figure 6:
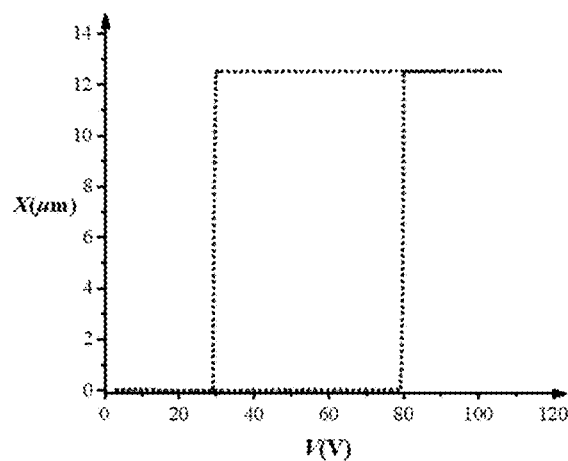

The learning rate of the optimizer is set to be $10^{-3}$. The determined autoencoder model framework is trained for 4 hours by PythonAPI. FIG. 6 shows a displacement curve of Preisach hysteresis model simulation and a hysteresis model displacement curve reconstructed by the deep learning network under the same driving voltage input.

Figure 7:
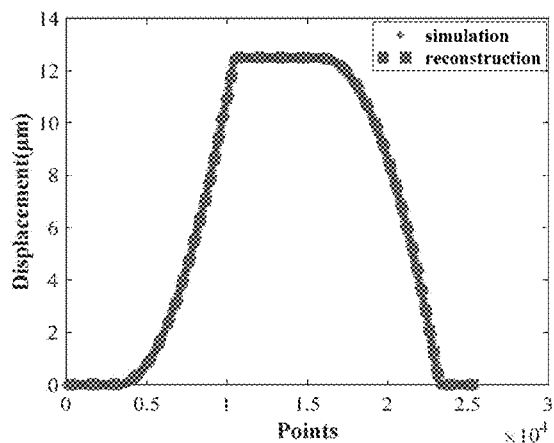
FIG. 7 is a comparison of the predicted displacement of the hysteresis model simulation and a displacement result reconstructed by the deep learning network, and corresponding errors.
Figure 7:
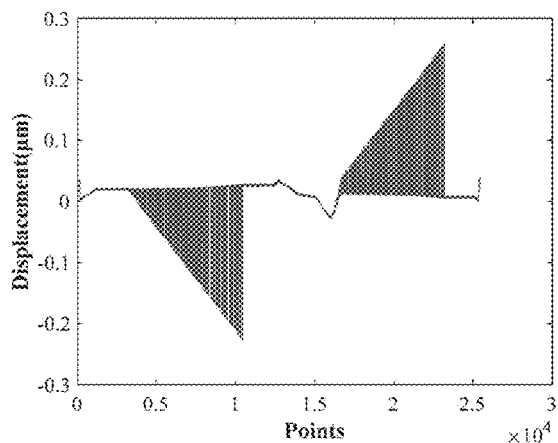

More intuitively, by taking a sampling point number as a horizontal axis and the hysteresis displacement result as a longitudinal axis, FIG. 7 shows a comparison of the displacement output result of the hysteresis model simulation and the displacement result reconstructed by the deep learning network. From FIG. 7, it can be seen that the two displacement curves are basically coincident. From Figure b), the corresponding error is capable of being obtained. The result shows that the maximum errors −0.2258 μm and 0.2589 μm respectively exist under the increasing threshold and the decreasing threshold, and the mean square error is 0.0041 μm. The displacement curve reconstructed by the network and the predicted displacement curve of the hysteresis model simulation which are obtained by the identification method of the disclosure keep basically coincident.

This result proves the correctness of the method of the disclosure of realizing linearization of the nonlinear system by using a new deep learning method to identify and represent the Koopman characteristic function. The possibility is provided for solving the hysteresis problem of the piezoelectric actuator.

What is claimed is:
1. A method comprising:
obtaining a hysteresis model of a piezoceramics driver:

$$x(t) = \int\int_{(\sigma \geq \varepsilon)} \mu(\sigma, \varepsilon)\hat{\gamma}_{\sigma\varepsilon}[v(t)]d\sigma d\varepsilon,$$

where x(t) is a displacement of the piezoceramics driver at time t, v(t) is an input voltage to the piezoceramics driver at time t, $\hat{\gamma}_{\sigma\varepsilon}$ and $\mu(\sigma,\varepsilon)$ are respectively a hysteresis operator and a weight function, σ and ε are respectively an upper threshold and a lower threshold for the hysteresis operator $\hat{\gamma}_{\sigma\varepsilon}$;
obtaining an approximate hysteresis model from the hysteresis model as:

$$x(t) \approx \sum_{i=1}^{M}\sum_{j=1}^{M} \mu(\sigma_i, \varepsilon_j)\hat{\gamma}_{\sigma_i\varepsilon_j}[v(t)],$$

increasing the input voltage to the piezoceramics driver from zero to $\sigma_i$ and then reducing the input voltage from $\sigma_i$ to $\varepsilon_i$ and determining the weight function $\mu(\sigma_i,\varepsilon_i)$ as a change of the displacement of the piezoceramics driver, wherein $$\sigma_i = \frac{(M-i)}{(M-1)}\sigma_1, \varepsilon_j = \frac{(M-j)}{(M-1)}\varepsilon_1,$$

and $\sigma_1$ and $\varepsilon_1$ are respectively a lower limit and an upper limit of the input voltage of the piezoceramics driver;
simulating values of the displacement of the piezoceramics driver from values of the input voltage, using the approximate hysteresis model, to obtain a training data set of the values of the displacement and the values of the input voltage;
applying a Koopman operator to the training data set and using a result thereof to train an artificial neural network.

* * * * *